United States Patent
Ahn (10) Patent No.: US 9,015,447 B2
(45) Date of Patent: Apr. 21, 2015

(54) MEMORY SYSTEM COMPRISING TRANSLATION LOOKASIDE BUFFER AND TRANSLATION INFORMATION BUFFER AND RELATED METHOD OF OPERATION

(75) Inventor: Hyun Sun Ahn, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 48 days.

(21) Appl. No.: 13/303,395

(22) Filed: Nov. 23, 2011

(65) Prior Publication Data

US 2012/0137105 A1 May 31, 2012

(30) Foreign Application Priority Data

Nov. 25, 2010 (KR) .................. 10-2010-0118178

(51) Int. Cl.
*G06F 12/00* (2006.01)
*G06F 12/10* (2006.01)

(52) U.S. Cl.
CPC .................. *G06F 12/1027* (2013.01)

(58) Field of Classification Search
CPC .................. G06F 12/1009; G06F 2212/652
USPC .................................................. 711/207
See application file for complete search history.

(56) References Cited

U.S. PATENT DOCUMENTS

| 6,895,492 | B2 | 5/2005 | Chiba | |
|---|---|---|---|---|
| 2006/0212675 | A1* | 9/2006 | Sartorius et al. | 711/205 |
| 2007/0094475 | A1* | 4/2007 | Bridges et al. | 711/207 |

FOREIGN PATENT DOCUMENTS

| JP | 05-216763 | 8/1993 |
|---|---|---|
| JP | 11-024995 | 1/1999 |
| JP | 2004-038808 | 2/2004 |

* cited by examiner

*Primary Examiner* — Gurtej Bansal
(74) *Attorney, Agent, or Firm* — Volentine & Whitt, PLLC (57) ABSTRACT

A memory system comprises a translation lookaside buffer (TLB) configured to receive a virtual address and to search for a TLB entry matching the virtual address, and a translation information buffer (TIB) configured to be connected to the TLB and determine whether a physical address corresponding to the virtual address falls into a continuous mapping area if the TLB entry matching the virtual address is not found.

14 Claims, 8 Drawing Sheets

MEMORY SYSTEM COMPRISING TRANSLATION LOOKASIDE BUFFER AND TRANSLATION INFORMATION BUFFER AND RELATED METHOD OF OPERATION

CROSS-REFERENCE TO RELATED APPLICATIONS

This application claims priority under 35 U.S.C. §119 to Korean Patent Application No. 10-2010-0118178 filed on Nov. 25, 2010, the disclosure of which is hereby incorporated by reference in its entirety.

BACKGROUND OF THE INVENTION

The inventive concept relates generally to electronic memory technologies. More particularly, the inventive concept relates to memory systems and related methods of operation.

Memory systems often use memory mapping to translate virtual memory addresses into physical memory addresses. The memory mapping is typically implemented using a virtual address space and a physical address space, where the virtual address space is an address space used by a processor when referring to address locations and the physical address space is an address space corresponding to actual hardware memory locations.

In conventional methods of operating memory systems, even where the physical address space is continuous, memory is allocated in statically sized units (e.g., 4 Kbytes), which can impede system performance.

SUMMARY OF THE INVENTION

According to one embodiment of the inventive concept, a memory system comprises a translation lookaside buffer (TLB) configured to receive a virtual address and search for a TLB entry matching the virtual address, and a translation information buffer (TIB) configured to be connected with the TLB and determine whether a physical address corresponding to the virtual address falls into a continuous mapping area where the TLB entry matching with the virtual address is not found.

According to another embodiment of the inventive concept, a memory system comprises a central processing unit (CPU) configured to generate a virtual address, and a memory management unit (MMU) configured to manage access of the CPU to a memory, receive the virtual address from the CPU, and map the virtual address to a physical address. The memory comprises a page table that maps the virtual address to the physical address. The MMU is able to access the memory and comprises a TLB configured to receive the virtual address and search for a TLB entry matching the virtual address and a TIB configured to be connected with the TLB and to determine whether the physical address corresponding to the virtual address falls into a continuous mapping area where the TLB entry matching the virtual address is not found.

According to still another embodiment of the inventive concept, a method of operating a memory system comprises receiving a virtual address and searching a TLB to identify a TLB entry matching the virtual address, and accessing a TIB to determine whether a physical address corresponding to the virtual address falls into a continuous mapping area upon determining that the TLB entry matching with the virtual address is not found in the TLB.

These and other embodiments of the inventive concept can be used to improve performance and reliability of a memory system.

BRIEF DESCRIPTION OF THE DRAWINGS

The drawings illustrate selected embodiments of the inventive concept. In the drawings, like reference numbers indicate like features unless the context indicates otherwise.

DETAILED DESCRIPTION

Selected embodiments of the inventive concept are described below with reference to the accompanying drawings. These embodiments are presented as teaching examples and should not be construed to limit the scope of the inventive concept.

In the description that follows, where an element is referred to as being "connected" to another element, it can be directly connected to the other element or intervening elements may be present. In contrast, where an element is referred to as being "directly connected" to another element, there are no intervening elements present. As used herein, the term "and/or" includes any and all combinations of one or more of the associated listed items and may be abbreviated as "/".

The terms first, second, etc., may be used herein to describe various elements, but these elements should not be limited by these terms. Rather, these terms are used merely to distinguish one element from another. For example, a first signal could be termed a second signal, and a second signal could be termed a first signal without departing from the disclosed teachings.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or this written description, and will not be interpreted in an idealized or overly formal sense unless expressly so defined herein.

Figure 1A:
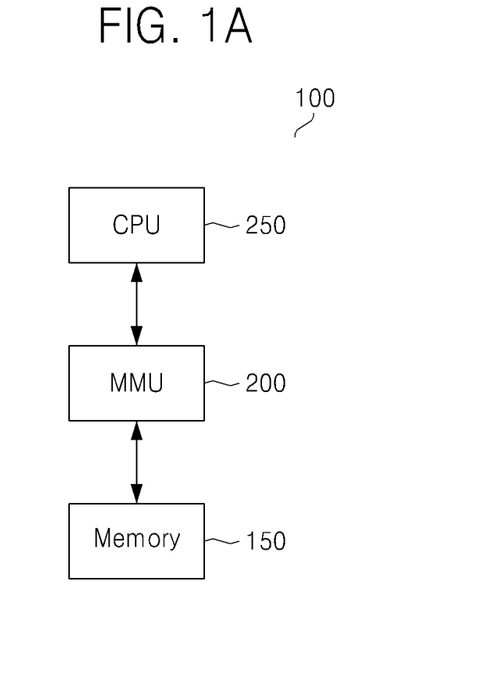
FIG. 1A is a diagram of a memory system according to an embodiment of the inventive concept.
Figure 1B:
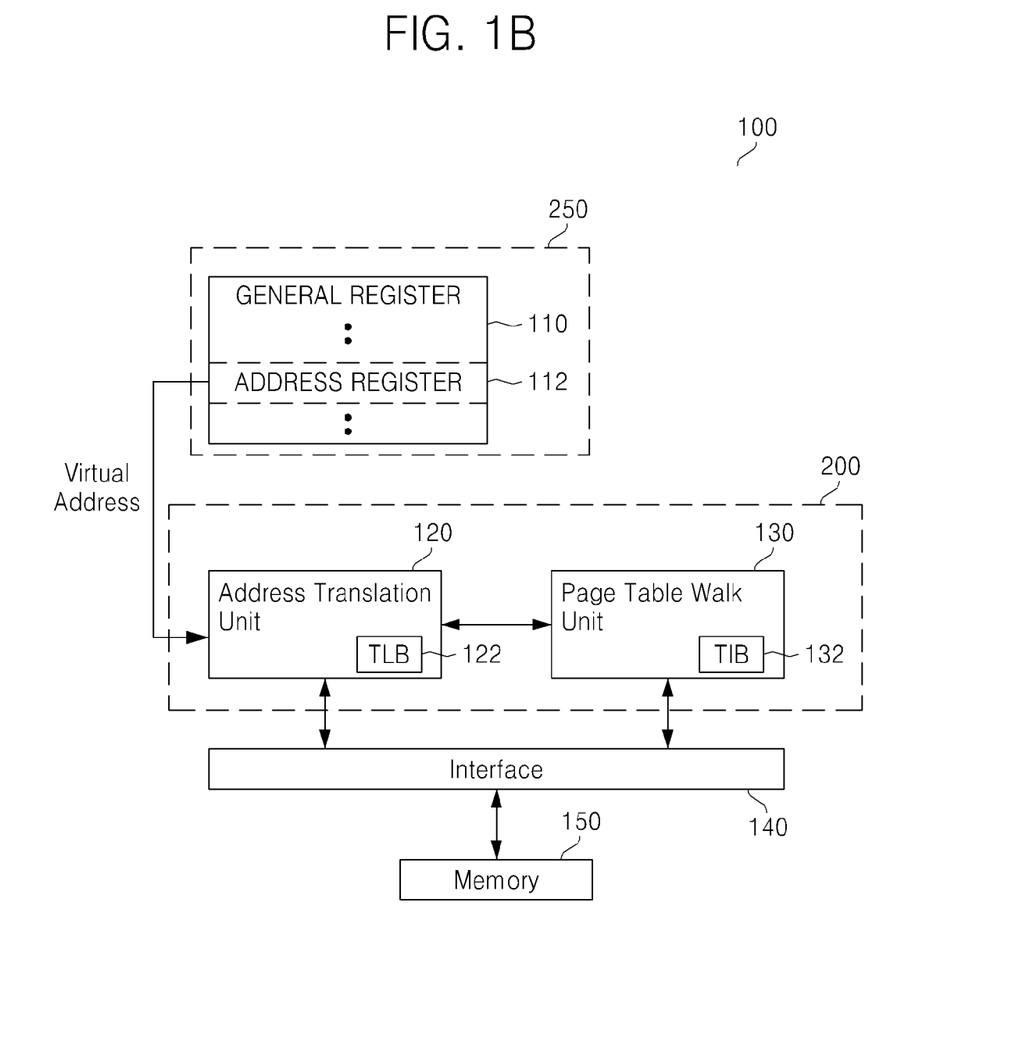
FIG. 1B is a detailed block diagram of the memory system illustrated in FIG. 1A according to an embodiment of the inventive concept.
Figure 2:
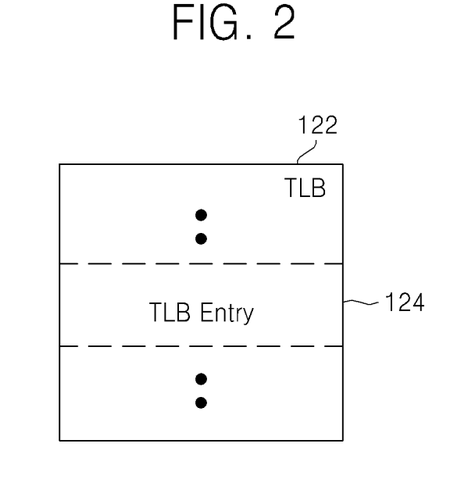
FIG. 2 is a diagram for explaining a translation lookaside buffer (TLB) illustrated in FIG. 1B.
Figure 3:
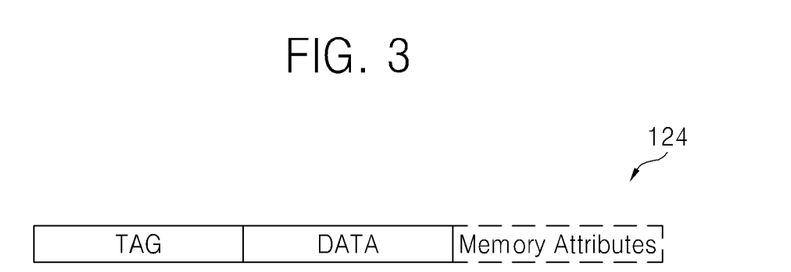
FIG. 3 is a diagram for explaining a TLB entry illustrated in FIG. 2.
Figure 4:
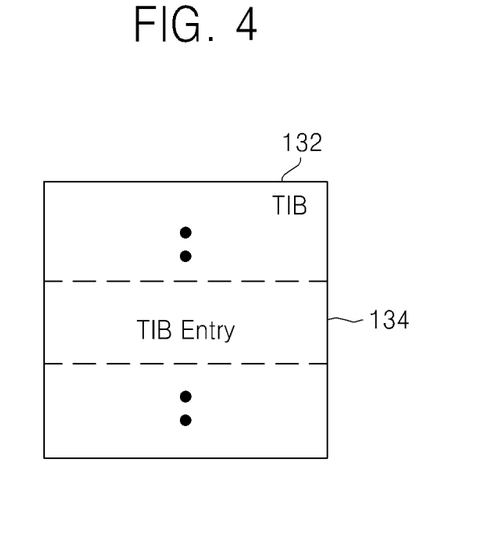
FIG. 4 is a diagram for explaining a translation information buffer (TIB) illustrated in FIG. 1B.
Figure 5:
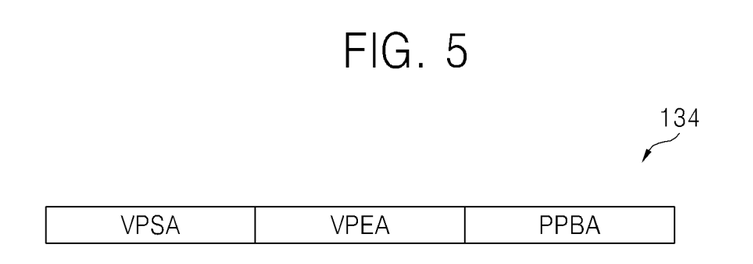
FIG. 5 is a diagram for explaining a TIB entry illustrated in FIG. 4.

FIG. 1A is a diagram of a memory system 100 according to an embodiment of the inventive concept, and FIG. 1B is a detailed block diagram of memory system 100 illustrated in FIG. 1A according to an embodiment of the inventive concept. FIG. 2 is a diagram for explaining a translation lookaside buffer (TLB) 122 illustrated in FIG. 1B. FIG. 3 is a diagram for explaining a TLB entry 124 illustrated in FIG. 2. FIG. 4 is a diagram for explaining a translation information buffer (TIB) 132 illustrated in FIG. 1B. FIG. 5 is a diagram for explaining a TIB entry 134 illustrated in FIG. 4.

Referring to FIG. 1A, memory system 100 comprises a central processing unit (CPU) 250, a memory management unit (MMU) 200, and a memory 150. CPU 250 generates a virtual address, and MMU 200 maps the virtual address to a physical address and accesses memory 150.

Memory 150 stores a page table that links the virtual address to the physical address. Memory 150 comprises a dynamic random access memory (DRAM) and a non-volatile memory (NVM). The NVM can take any of various forms, such as an electrically erasable programmable read-only memory (EEPROM), magnetic RAM (MRAM), spin-transfer torque MRAM, ferroelectric RAM (FeRAM), phase-change RAM (PRAM), resistive RAM (RRAM), nanotube RRAM, polymer RAM, nano floating gate memory, holographic memory, molecular electronics memory device, or insulator resistance change memory.

Referring to FIG. 1B, memory system 100 comprises a general register 110, an address translation unit 120, a page table walk unit 130, an interface 140, and memory 150. General register 110 is located within CPU 250, and address translation unit 120 and page table walk unit 130 are located within MMU 200.

Memory system 100 can be an electronic device such as a portable terminal, a digital camera, a notebook computer, a personal computer (PC), a cellular phone, or a personal digital assistant (PDA). However, memory system 100 is not restricted to the above electronic devices.

In memory system 100, data is typically grouped into memory blocks of a predetermined length, referred to as pages. For instance, a minimum address unit of memory may be a byte and a set of sequential addresses may be formed of a set of sequential memory bytes. Accordingly, a page may be defined as a block comprising a predetermined number of sequential memory bytes. In certain embodiments, the page comprises a number of bytes equal to a power of 2 (e.g., $2^{12}$=4096 or 4 Kbytes). In other words, the page may have a size L (e.g., 4096 bytes or 4 Kbytes).

In memory addressing of memory system 100, a virtual memory may be implemented using paging. Where paging is used, a virtual address space is typically divided into fixed-size blocks referred to as pages, and each page is mapped or translated to a physical address. Mapping between a virtual address and a physical address can then be decided and maintained using a page table. Such mapping can be implemented, for example, according to a predetermined memory system operating method or algorithm performed by page table walk unit 130 of memory system 100. The page table is typically stored in memory 150. However, to accelerate paging, a part of the page table can be stored in TLB 122 or TIB 132.

Although a translated address is described as a physical address, the translated address may be used for many other purposes. For instance, before obtaining a physical address, the translated address may be subjected to further translation. Additionally, although a virtual address space is translated in certain embodiments, other types of addresses can be translated in other embodiments.

Memory system 100 performs mapping between a virtual address space and a physical address space. In general, the virtual address space and the physical address space may be divided into pages. Virtual page number information is mapped to physical page number information, and lower N bits of the virtual address are linked to a physical page number to achieve virtual-to-physical address mapping. In other words, the virtual address and the physical address corresponding to the virtual address may always have the same number of lower bits, i.e., N lower bits. Here, N is the logarithm of a page size (in bytes), e.g., L, to base 2 (e.g., $\log_2 L$). Accordingly, the virtual address space and the physical address space may be divided into blocks of consecutive addresses. Each virtual address provides virtual page number information, and physical page number information indicates a position of a particular page of data in memory 150.

The page table in memory 150 can store physical page number information corresponding to each unit of virtual page number information in memory system 100. In other words, the page table can include mapping between virtual page number information and physical page number information with respect to all virtual page number information in the virtual address space.

As shown in FIG. 4, the page table can comprise a plurality of page table entries, where each page table entry indicates a page corresponding to particular virtual address information in memory 150. Address translation unit 120 comprises TLB 122 and page table walk unit 130 comprises TIB 132. General register 110 comprises a plurality of address registers. FIG. 1B shows an address register 112 as an example of each of the address registers.

Referring to FIGS. 1A through 5, address register 112 comprises page offset information in a lowermost bit and virtual page number information in an uppermost bit. The virtual page number information indicates a particular page among a plurality of pages in memory 150, and the page offset information indicates a position of the particular page. For instance, where address register 112 is a 32-bit register, 0th through 9th bits may include the page offset information and 10th through 31st bits may include the virtual page number information.

Address register 112 provides a virtual address to TLB 122 of address translation unit 120. TLB 122 searches a plurality of TLB entries according to a management size in order to determine whether TLB entry 124 has a tag matching with the virtual address provided by address register 112.

Where the search result is a TLB hit, i.e., where TLB entry 124 including a physical address corresponding to the virtual address provided by address register 112 is found, physical addresses are searched on TLB 122.

Where the search result is a TLB miss, i.e., where TLB entry 124 including a physical address corresponding to the virtual address provided by address register 112 is not found, TLB 122 accesses memory 150 through page table walk unit 130 and searches the page table.

TLB 122 comprises a plurality of TLB entries and FIGS. 2 and 3 show TLB entry 124 as an example of each of the TLB entries. TLB entry 124 comprises a tag including virtual page number information and data comprising physical page number information. TLB entry 124 may further comprise memory attributes such as "read" and "write".

Although address translation unit 120 is provided within MMU 200 in FIG. 1B, it may be provided within CPU 250 together with general register 110 and page table walk unit 130.

Page table walk unit 130 comprises TIB 132, which stores physical address information. TIB 132 comprises a plurality of TIB entries, and TIB entry 134 is shown in FIG. 4 as an example of these TIB entries.

In case of a TLB miss, TIB 132 determines whether a physical address corresponding to a virtual address falls into a continuous mapping area based on the TIB entries. Where it is determined that the physical address falls into the continuous mapping area, TIB 132 adjusts the management size of TLB 122 and transmits the adjusted management size to TLB 122. Thereafter, TLB 122 allocates TLB entries according to the adjusted management size. For instance, where the management size of TLB 122 is 4 Kbytes, TLB 122 conventionally allocates 4 Kbytes for each TLB entry 124 when searching data. However, according to the embodiments of FIGS. 1 through 4, where a physical address corresponding to a virtual address falls into a continuous mapping area, TIB 132 adjusts the management size of TLB 122 (e.g., from 4 Kbytes to 1 Mbyte) according to the continuous mapping area, and transmits the adjusted management size of 1 Mbyte to TLB 122. Accordingly, TLB 122 allocates TLB entry 124 according to the adjusted management size when searching data. Where the physical address does not fall into a continuous mapping area, TIB 132 accesses memory 150.

Referring to FIG. 5, TIB entry 134 stores a virtual page start address VPSA, a virtual page end address VPEA, and physical address information, i.e., a physical page basic address PPBA. TIB 132 determines whether a physical address corresponding to the virtual address falls into the continuous mapping area using physical address information obtained by accessing memory 150 and virtual page end address VPEA.

When adjusting the management size of TLB 122 according to the continuous mapping area, TIB 132 may store information about the adjusted management size, or the information may be transmitted to and stored in TLB 122. For instance, in case of a TLB miss, where it is determined that physical address information that TIB 132 has obtained by accessing memory 150 is consecutive to physical address information already stored in TIB 132, TIB 132 may adjust and update a current management size of TLB 122 based upon the continuation and store a new management size for TLB 122.

Where a storage space of TIB 132 is full because of existing information regarding management sizes that have already been stored in TIB 132, TIB 132 may erase particular information (e.g., information about the smallest management size for TLB 122) among the existing information and store the new management size for TLB 122.

Figure 6:
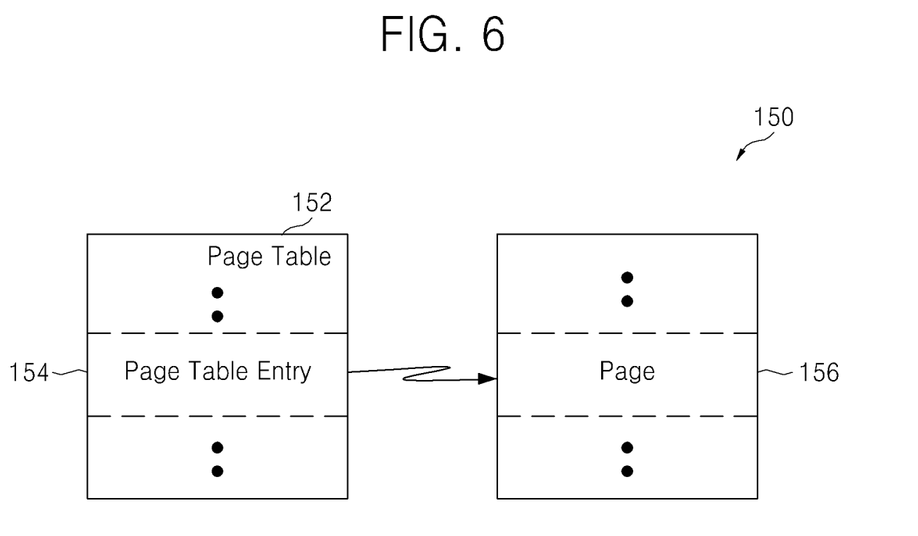
FIG. 6 is a diagram for explaining the memory illustrated in FIG. 1B.

FIG. 6 is a diagram for explaining memory 150 illustrated in FIG. 1B. Referring to FIG. 6, memory 150 comprises a page table 152 and a plurality of pages. Page table 152 comprises a plurality of page table entries. FIG. 6 shows a page table entry 154 as an example of the page table entries.

Page table entry 154 indicates a page 156 corresponding to a virtual address in physical memory 150. For instance, page table entry 154 comprises a physical address of page 156 and access information of page 156.

Figure 7:
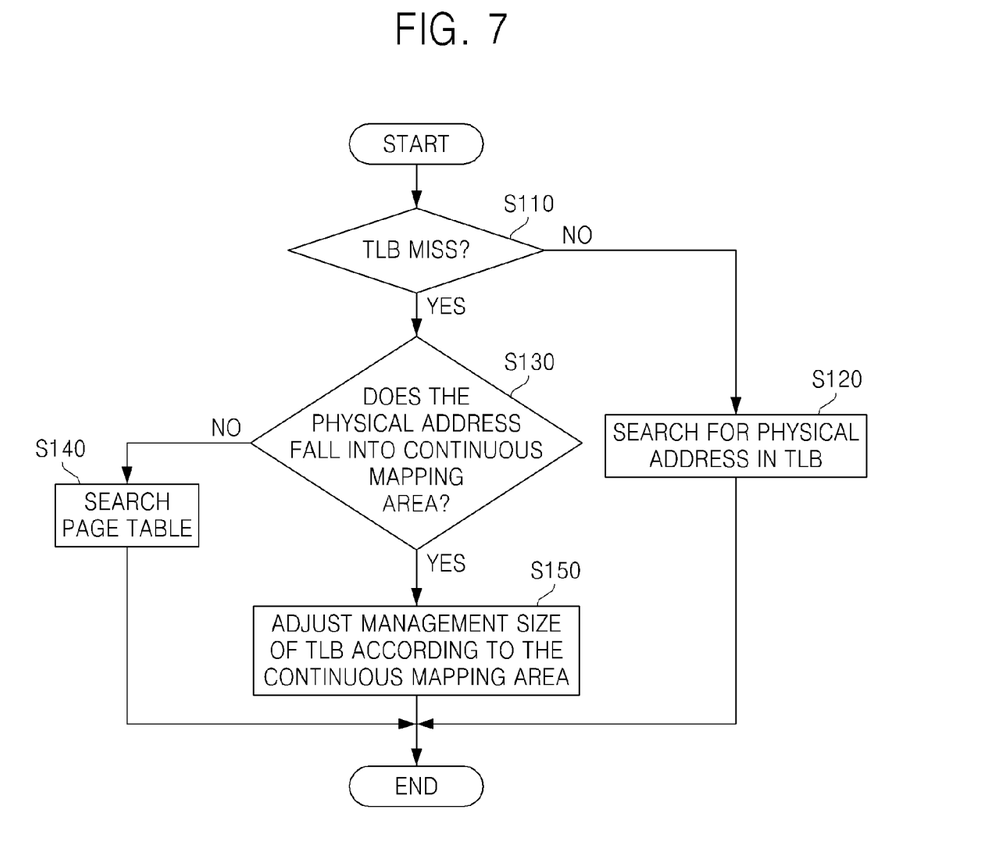
FIG. 7 is a flowchart illustrating a method of operating a memory system according to an embodiment of the inventive concept.

FIG. 7 is a flowchart illustrating a method of operating a memory system according to an embodiment of the inventive concept. For convenience of explanation, it will be assumed that the method of FIG. 7 is performed by memory system 100 of FIG. 1B. However, it could alternatively be performed by another system.

Referring to FIGS. 1A through 7, the method determines whether a TLB miss has occurred (S110). In other words, it determines whether TLB entry 124 including the physical address corresponding to the virtual address provided by address register 112 is not found. Where it is determined that a TLB miss has not occurred (S110=NO), or in other words, where a TLB hit has occurred, the physical address corresponding to the virtual address is searched for in TLB 122 (S120). However, where a TLB miss is detected (S110=YES), TIB 132 determines whether the physical address corresponding to the virtual address falls into the continuous mapping area (S130).

Where it is determined that the physical address corresponding to the virtual address does not fall into the continuous mapping area (S130=NO), TIB 132 accesses memory 150 and searches page table 152 (S140).

However, where it is determined that the physical address corresponding to the virtual address falls into the continuous mapping area (S130=YES), TIB 132 adjusts a current management size of TLB 122 according to the continuous mapping area and transmits a new management size to TLB 122 in operation S150. For instance, where the current management size of TLB 122 is 4 Kbytes and the continuous mapping area of a consecutive 4-Kbytes is 1 Mbyte, TIB 132 adjusts the management size of TLB 122 to 1 Mbytes and transmits information about the new management size of 1 Mbytes to TLB 122. Then, TLB 122 allocates 1 Mbytes for TLB entry 124 when searching data.

In the method of FIG. 7, the continuous mapping area is allocated one space of memory 150 at a time, so that the number of accesses to memory 150 is reduced. As a result, system performance is increased as compared to a case where memory 150 is allocated in units of only 4 Kbytes.

In general, the inventive concept can be embodied in hardware, software, or combination thereof. It can also be embodied by computer-readable codes stored on a computer-readable medium, which can be any data storage device capable of storing data as a program that can be read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be readily construed by programmers skilled in the art.

As indicated by the foregoing, certain embodiments of the inventive concept can improve the performance and reliability of a memory system.

While the inventive concept has been particularly shown and described with reference to certain embodiments, it will be understood by those of ordinary skill in the art that various changes in forms and details may be made therein without departing from the scope of the inventive concept as defined by the claims.

What is claimed is:

1. A memory management system, comprising:
   a translation lookaside buffer (TLB) unit configured to receive a virtual address and search for a TLB entry matching the virtual address; and
   a translation information buffer (TIB) unit configured to receive a TLB miss signal from the TLB unit, wherein the TIB unit has at least one TIB entry comprising a virtual page start address, a virtual page end address, and physical address information, and the TIB unit determines whether a physical address corresponding to the virtual address falls into a continuous mapping area using physical address information obtained by accessing a memory and the virtual page end address, and wherein the TIB unit is configured to adjust a management size of the TLB unit according to the continuous mapping area, and the TLB unit allocates multiple different subsequent TLB entries according to a new management size obtained as a result of the adjustment.

2. The memory management system of claim 1, wherein the memory comprises a page table, wherein the TIB unit accesses the memory via an interface and adjusts the management size of the TLB unit where the physical address corresponding to the virtual address falls into the continuous mapping area.

3. The memory management system of claim 2, wherein the page table maps the virtual address to the physical address.

4. The memory management system of claim 1, further comprising a general register configured to provide the virtual address to the TLB unit.

5. The memory management system of claim 4, wherein the general register comprises a plurality of address registers each configured to generate the virtual address.

6. A memory management system, comprising:
a central processing unit (CPU) configured to generate a virtual address; and
a memory management unit (MMU) configured to manage access of the CPU to a memory, receive the virtual address from the CPU, and map the virtual address to a physical address;
wherein the memory comprises a page table that maps the virtual address to the physical address, and
wherein the MMU is able to access the memory and comprises:
a translation lookaside buffer (TLB) unit configured to receive the virtual address and search for a TLB entry matching the virtual address; and
a translation information buffer (TIB) unit configured to receive a TLB miss signal from the TLB unit,
wherein the TIB unit has at least one TIB entry comprising a virtual page start address, a virtual page end address, and physical address information, and the TIB unit determines whether a physical address corresponding to the virtual address falls into a continuous mapping area using physical address information obtained by accessing the memory and the virtual page end address, and
wherein the TIB unit is configured to adjust a management size of the TLB unit according to the continuous mapping area, and the TLB unit allocates multiple different subsequent TLB entries according to a new management size obtained as a result of the adjustment.

7. The memory management system of claim 6, wherein the TIB unit accesses the memory via an interface associated with the TIB unit and the TLB unit.

8. The memory management system of claim 6, wherein the memory comprises a volatile memory and a nonvolatile memory.

9. The memory management system of claim 6, wherein the CPU comprises a general register configured to provide the virtual address to the TLB unit.

10. The memory management system of claim 9, wherein the general register comprises a plurality of address registers each configured to generate the virtual address.

11. A method of operating a memory management system, comprising:
receiving a virtual address and searching a translation lookaside buffer (TLB) unit to identify a TLB entry matching the virtual address;
receiving a TLB miss signal from the TLB unit;
accessing a translation information buffer (TIB) unit to determine whether a physical address corresponding to the virtual address falls into a continuous mapping area, upon determining that a TLB entry matching the virtual address is not found in the TLB unit;
adjusting a management size of the TLB unit according to the continuous mapping area upon determining that the physical address corresponding to the virtual address falls into the continuous mapping area; and
allocating multiple different subsequent TLB entries according to a new management size obtained as a result of the adjustment,
wherein the TIB unit has at least one TIB entry comprising a virtual page start address, a virtual page end address, and physical address information, and the TIB unit determines whether the physical address corresponding to the virtual address falls into the continuous mapping area using physical address information obtained by accessing a memory and the virtual page end address.

12. The method of claim 11, further comprising:
searching the TLB unit for the physical address corresponding to the virtual address upon determining that the TLB entry matching the virtual address is found in the TLB.

13. The method of claim 11, further comprising:
searching a page table upon determining that the physical address corresponding to the virtual address does not fall into the continuous mapping area.

14. The method of claim 13, wherein the page table maps the virtual address to the physical address.

* * * * *